United States Patent

Van Der Geer

[15] 3,668,195

[45] June 6, 1972

[54] PROCESS FOR PRODUCING FIBRIDS FROM LATEX FOAM

[72] Inventor: Willem Jan Van Der Geer, Oosterbeek, Netherlands

[73] Assignee: The B. F. Goodrich Company, New York, N.Y.

[22] Filed: Oct. 16, 1968

[21] Appl. No.: 768,168

[30] Foreign Application Priority Data

Oct. 20, 1967 Netherlands..........................6714246

[52] U.S. Cl. .............................260/94.7 R, 23/252, 162/24, 162/26, 162/164, 162/169, 260/29.6 PT, 260/29.7 PT, 260/96 R, 260/723, 260/767, 260/821, 260/815, 264/14, 264/184

[51] Int. Cl. .......................................C08d 5/00, C08c 1/14

[58] Field of Search ................260/2.5 L, 29.6 PM, 29.6 PT, 260/29.7 PT, 94.7 R, 96 R, 723, 767, 821, 822, 815; 264/182, 184, 12–15, 9, 14; 162/101, 169, 164, 24, 26; 23/252, 285, 1

[56] References Cited

UNITED STATES PATENTS

| | | | |
|---|---|---|---|
| 3,100,733 | 8/1963 | Bundy.....................................264/126 |
| 3,342,921 | 9/1967 | Brundadge et al.....................264/203 |
| 3,410,819 | 11/1968 | Kourtz..................................260/29.6 |
| 3,498,935 | 3/1970 | Noble...............................260/2.5 L |
| 3,502,745 | 3/1970 | Miufon..................................264/402 |
| 2,676,099 | 4/1954 | Kao et al...............................162/169 |
| 2,797,201 | 6/1957 | Veatch et al............................264/13 |
| 2,908,659 | 10/1959 | Shashoua.............................260/32.6 |
| 3,051,545 | 8/1962 | Steuber..................................264/182 |
| 3,293,114 | 12/1966 | Kenaga et al. .........................162/169 |
| 3,432,579 | 3/1969 | Zavasnik..............................264/14 |
| 3,472,801 | 10/1969 | Lerman et al..........................264/13 |
| 3,494,987 | 2/1970 | Ioka et al................................264/13 |
| 3,529,936 | 9/1970 | Muller-Rid et al.....................264/14 |

Primary Examiner—Jay H. Woo
Attorney—Robert W. Wilson

[57] ABSTRACT

Paper-like and non-woven sheet-form articles of superior properties are produced by a process in which an aqueous latex of a polymeric binder material of natural or synthetic origin is first foamed, as by beating with air, the resulting foamed latex mixed with a coagulant under vigorous agitation to form directly an aqueous suspension of mainly flocculent particles of uniform particle size distribution, the resulting suspension of binder particles admixed with an aqueous suspension of fibers and the resulting mixed suspension dewatered to form a sheet which is then dried. The binder particles obtained by coagulation of a foamed latex produce products of higher wet and dry strengths and are more efficient in that more of the binder is retained by the fibers and less is lost in the dewatering operation.

4 Claims, No Drawings

PROCESS FOR PRODUCING FIBRIDS FROM LATEX FOAM

BACKGROUND OF INVENTION

The invention relates to the preparation of an aqueous suspension of sheet-forming particles by contacting a polymer latex with a coagulant, with vigorous stirring, and more particularly to the use of said suspension in the manufacture of sheet-formed products.

By "sheet-forming particles" are to be understood here non-rigid particles having at least one dimension no greater than about 10 microns and of minor magnitude relative to the other dimensions.

It is known to produce particles of this type by contacting a latex with a coagulant under turbulent conditions of mixing. This process is described, inter alia, in the Netherlands Pat. Application No. 241,112, which, more particularly, is concerned with the use in the coagulation process of a certain amount of a protective agent to prevent coalescence of the polymer coagulate.

The sheet-forming particles are very suitable for use as binder in the manufacture by the wet method of paper-like or textile-like (non-woven) fiber-sheeting, as described in the Netherlands Pat. Application No. 64–02859.

It has been observed that the sheet-forming particles prepared by this known process show a great spread in size and that their shape ranges mainly from granular to fibrous. As a result of said great spread, the retention on the screen in the sheet-forming process is relatively low owing to the passage therethrough of the small particles, and the sheet obtained shows inhomogeneities. Furthermore, as the particles are often granular in nature the available adhesion surface per volume particle is relatively small, which manifests itself, inter alia, in generally insufficient wet and dry strengths of the sheet obtained.

SUMMARY OF INVENTION

An improved process has now been found, by which sheet-forming particles may be obtained which do not show the abovementioned drawbacks.

The invention consists in that the turbulent coagulation is carried out, using a latex which has beforehand been foamed.

In principle, any latex of a synthetic or natural polymer is suitable to be used in the process according to the invention. More particularly, synthetic polymers selected from the class consisting of of styrene-butadiene copolymers and polymers prepared from acrylates, acrylonitrile, and vinyl chloride, may be employed. These polymers and other suitable types are also mentioned in the Netherlands Pat. Applications Nos. 241,112 and 64–02859; the coagulants mentioned therein, more particularly electrolyte solutions, can be used also in the present process.

The latex is first foamed by a usual mechanical and/or chemical method and subsequently contacted with the coagulant. It has surprisingly been found that mainly flocculent and filmy particles are formed then which shown a considerably lower spread in size than was heretofore possible with the known process.

This unexpected result, anyhow, leads to the conjecture that owing to the use of a latex foam of the present type the polymer is as it was pre-shaped so that it may coagulate to particles of the desired shape and size.

With the process according to the invention the shape of the particles and the distribution of the particle size can be controlled satisfactorily. The various factors that play a role here can be controlled by a man skilled in the art so as to obtain optimum results in the case of a given application.

Variable factors that play a role in foaming are, for instance, the solids content of the latex, the foaming factor (increase in volume caused by air whipped into the latex), the addition of thickening agents such as CMC, stabilizers and other auxiliary substances such as resins.

Examples of variable factors in the coagulation are the stirring speed, the concentration and type of the coagulant, the mixing ratio of the latex foam and coagulant, and the temperature.

The process according to the invention is especially suitable for the preparation and processing of the coagulate particles in a continuous process. It is possible, for instance, to feed the latex foam and the coagulant, for instance a solution of an electrolyte such as aluminum sulphate in separate and continuous streams to a turbulent mixing zone, to continuously discharge the formed particle suspension, to mix it with a fiber suspension and subsequently to process it to a paper-like or textile-like sheeting, for instance on a paper-making machine. Said processing may comprise, inter alia, drying, pressing with or without the application of heat, impregnating with resins, etcetera, patterning, etcetera. With regard to these and like methods of processing, reference is made to the Netherlands Pat. Application No. 64–02859.

It should be added that especially in the direct processing of the particle suspension according to the invention it is not necessary to carry out the coagulation in the presence of an excess of protective agents as described in the Netherlands Pat. Application No. 214,122. Another possibility, which in some cases leads to a high particle retention and an improved adhesion, consists in first mixing the latex foam with a small amount of fibers.

The process according to the invention will be further elucidated in the following example.

DETAILED DESCRIPTION

EXAMPLE

In an Oaks continuous foam mixer, type 4, latices of which the recipes are listed below are whipped (rotor speed 300 r.p.m.) to foam weights of about 250 g/l.

The foam obtained is, with vigorous stirring, contacted with a coagulant consisting of an aqueous solution of 0.5 percent by weight of aluminum sulphate, the mixing ratio being about 1.25 l of coagulant per 1 l of foam.

For comparison non-foamed latices of the same recipes are contacted with the coagulant under equal conditions, i.e. the mixing ratio is about 5 l of coagulant per 1 l of the latex mixture.

| Composition, in parts by weight of solids | PVC latex 1) | Acrylate latex 2) | SBR latex 3) |
|---|---|---|---|
| polymer | 100 | 100 | 100 |
| Lytron 820-emulsifier (Messrs. Monsanto) | — | — | 1.5 |
| potassium oleate (emulsifier) | — | — | 1.0 |
| potassium hydroxide | — | — | 0.27 |
| carboxymethyl cellulose | 2 | 1.8 | 1.5 |
| solids content, in % by weight | 12.1 | 12.8 | 13.2 |
| viscosity, in centipoises | 83 | 94 | 72 |
| pH | 9.6 | 6.6 | 9.0 |

1. "Geon 576" a registered T.M. of The B.F.Goodrich Company, Akron, Ohio, U.S.A.; a polyvinyl chloride latex made and sold by B.F.Goodrich Chemical Company, Cleveland, Ohio, U.S.A.
2. A latex of heat curable interpolymer of a monomer mixture of 75 percent ethyl acrylate, 20 percent styrene, 3 percent acrylonitrile, and 1 percent each of acrylic acid and N-methylol acrylamide.
3. A butadiene/styrene copolymer latex.

Microscopical examination of the particles obtained in these experiments shows that the use of foam according to the invention leads to the formation of particles that are mainly flocculent and which show relatively little spread in size, whereas the particles obtained from the non-foamed latices are mainly granular to fibrous and show a considerable spread in size.

The particle suspensions prepared from the above-mentioned latices are subsequently mixed with a 0.1 percent by weight aqueous suspension of rayon fibers (1.5 denier, 6 mm long). The mixing ratio is about 15 parts by weight of sheet-forming particles to 100 parts by weight of fibers.

Immediately thereafter the suspension mixtures are filtered off in the form of wet sheets on a screen, after which the wet sheets are dried on a photographic print glazing plate and hardened to the air for 5 minutes at 150° C. to a dry sheet having an area weight of about 60 g/m². The breaking length in the wet and dry conditions is determined.

Finally, the sheets are pressed at 75° C. for 1 minute, after which the breaking length is again determined in the wet (after 24 hours in water) and dry conditions.

The following table shows the results of the above-mentioned coagulation and sheet-forming experiments.

| Breaking length in metres, measured on— | PVC-latex | | Acrylate-latex | | SBR-latex | |
|---|---|---|---|---|---|---|
| | Non-foamed | Foamed | Non-foamed | Foamed | Non-foamed | Foamed |
| Filtered sheet: | | | | | | |
| Wet | 275 | 300 | 140 | 150 | 95 | 105 |
| Dry | 1,200 | 1,280 | 830 | 1,040 | 420 | 1,010 |
| Pressed sheet: | | | | | | |
| Wet | 275 | 325 | 150 | 140 | 100 | 125 |
| Dry | 1,200 | 1,450 | 950 | 1,125 | 540 | 1,250 |

What is claimed is:

1. In a process for the preparation of an aqueous suspension of binder particles useful in the production of paper-like and non-woven textile sheets by the coagulation of a latex of a synthetic binder polymer selected from the class consisting of styrene-butadiene copolymers and polymers prepared from acrylates, acrylonitrile and vinyl chloride, the improvement which comprises first foaming the said latex by any of the usual chemical and/or chemical methods and then mixing the resulting foamed latex with an aqueous coagulant solution under vigorous agitation to form an aqueous suspension of filmy flocculent polymeric binder particles of uniform size, the said mixing of latex and coagulant solution being effected employing suitable agitation speed, concentration of coagulant, and ratio of latex and coagulant as to yield said binder particles having one dimension no greater than about 10 microns and of minor magnitude relative to the other dimensions thereof.

2. The process as defined in claim 1 and further characterized by said polymer latex being a polyvinyl chloride latex.

3. The process as defined in claim 1 and further characterized by said polymer latex being latex of a heat-curable acrylate polymer.

4. The process as defined in claim 1 and further characterized by said polymer latex being a butadiene styrene copolymer latex.

* * * * *